July 10, 1923.

C. O. ROBINSON

CONVERTIBLE BABY CARRIAGE

Filed Jan. 5, 1920

Inventor
Charles O. Robinson
By his Attorneys
Williamson & Merchant

July 10, 1923.
C. O. ROBINSON
CONVERTIBLE BABY CARRIAGE
Filed Jan. 5, 1920
1,461,458
4 Sheets-Sheet 2
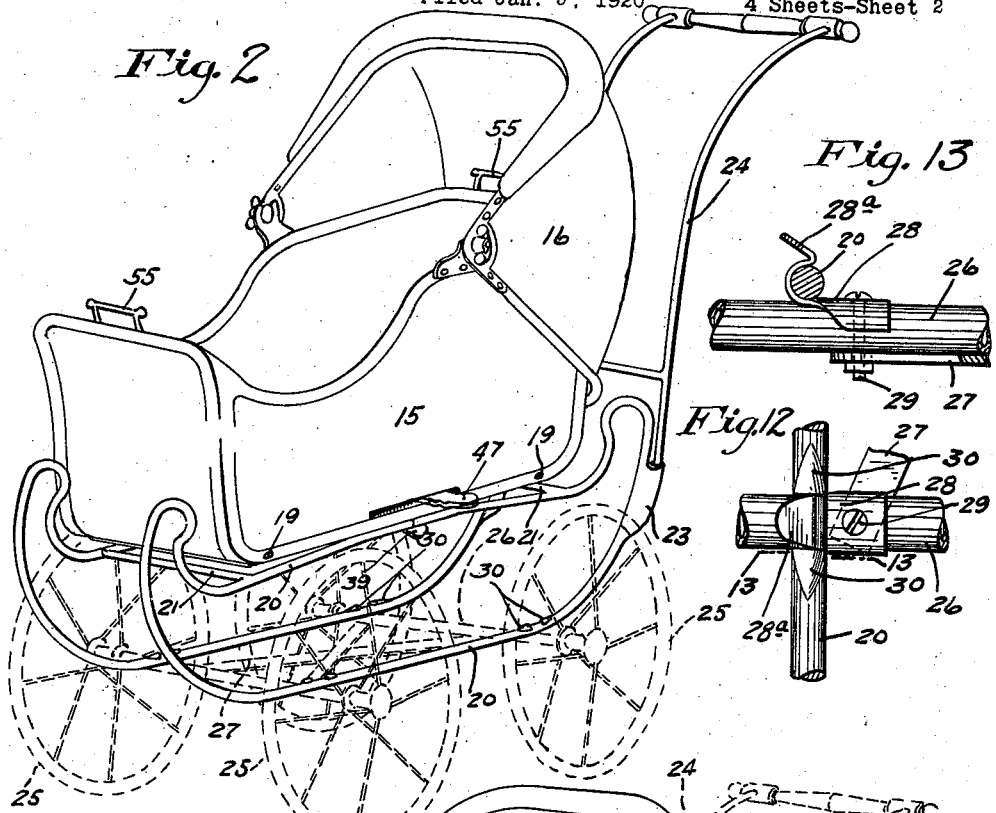
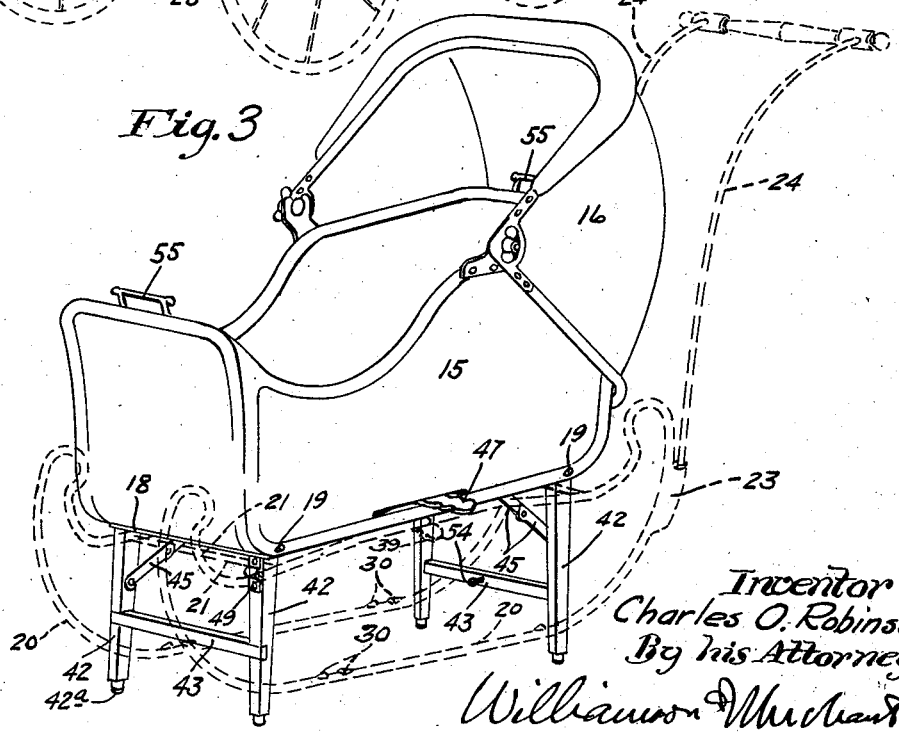
Inventor
Charles O. Robinson
By his Attorneys
Williamson & Merchant July 10, 1923.　　　　　　　　　　　　　　　　　1,461,458
C. O. ROBINSON
CONVERTIBLE BABY CARRIAGE
Filed Jan. 5, 1920　　　　4 Sheets-Sheet 3
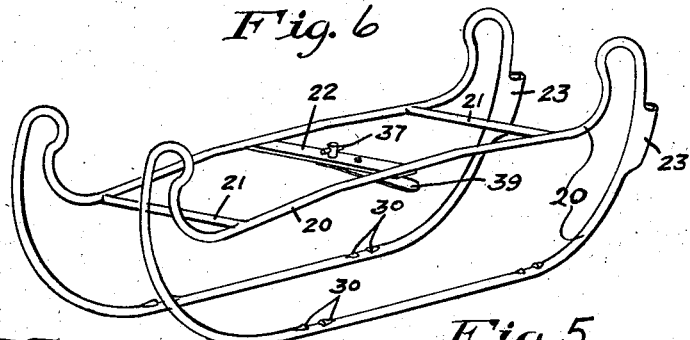
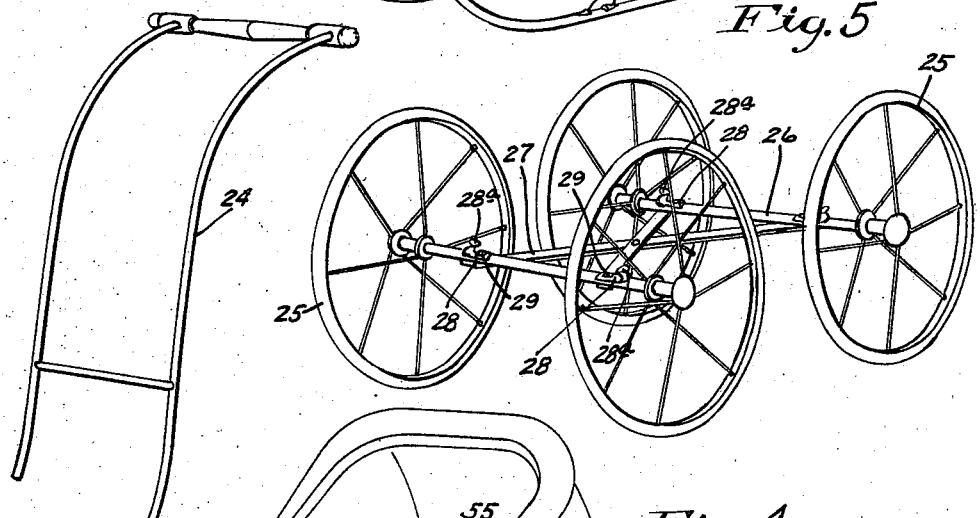
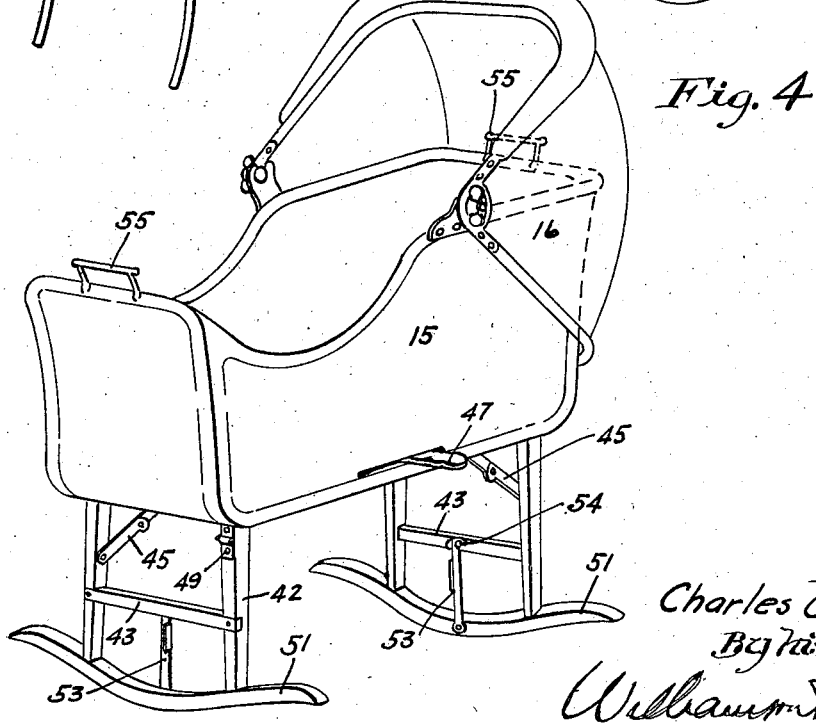
Inventor
Charles O. Robinson
By his Attorneys July 10, 1923.
C. O. ROBINSON
CONVERTIBLE BABY CARRIAGE
Filed Jan. 5, 1920
1,461,458
4 Sheets-Sheet 4
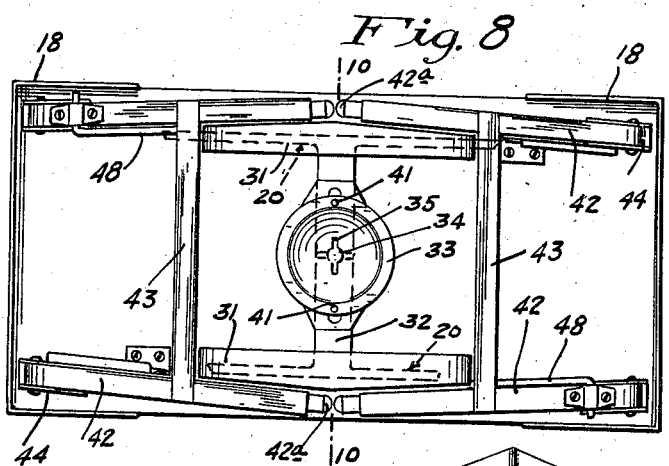
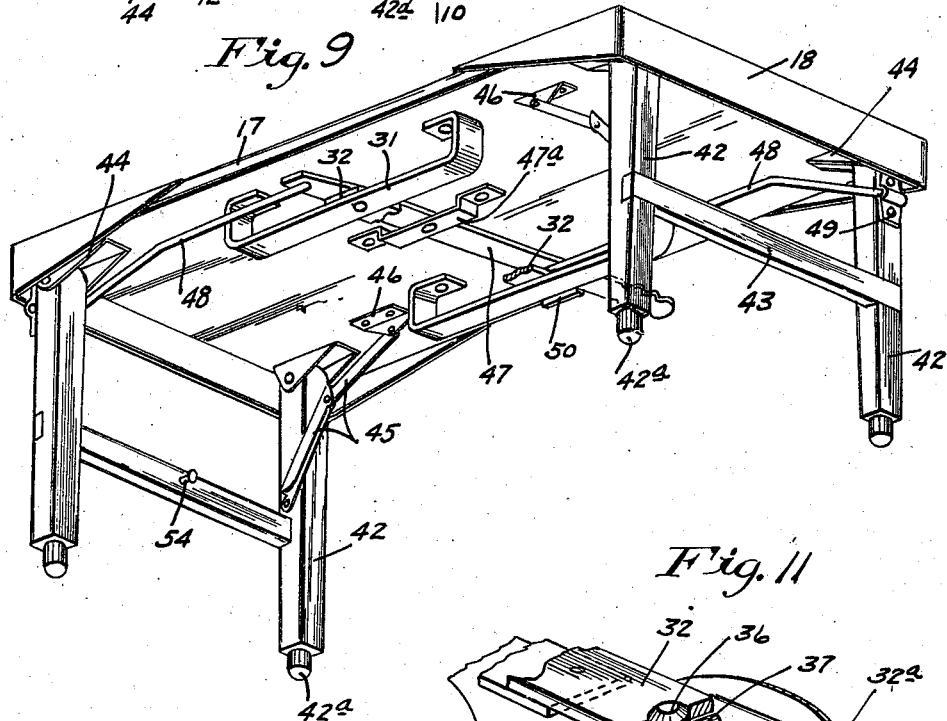
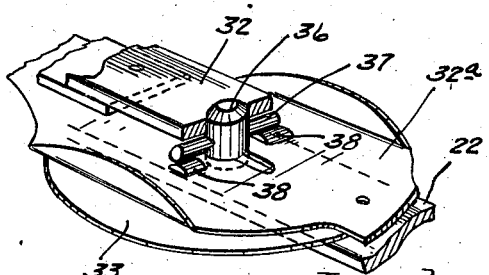
Inventor
Charles O. Robinson
By his Attorneys Patented July 10, 1923.

1,461,458

UNITED STATES PATENT OFFICE.

CHARLES O. ROBINSON, OF BISMARCK, NORTH DAKOTA.

CONVERTIBLE BABY CARRIAGE.

Application filed January 5, 1920. Serial No. 349,387.

*To all whom it may concern:*

Be it known that I, CHARLES O. ROBINSON, a citizen of the United States, residing at Bismarck, in the county of Burleigh and State of North Dakota, have invented certain new and useful Improvements in Convertible Baby Carriages; and I do hereby declare the following to be a full, clear, and exact description of the invention, such as will enable others skilled in the art to which it appertains to make and use the same.

My invention relates to what may be briefly designated as a convertible baby carriage, but which, in fact, by novel, simple and efficient means, is made readily usable, either as a baby carriage proper, running on wheels, a sleigh or sled, running on runners, a bed or crib standing on legs, or as a cradle mounted on rockers.

The invention, of course, involves various novel features which make the vehicle readily convertible, as above generally indicated. For instance, there is a decidedly novel arrangement, whereby the runners, which, in the wheel vehicle, are utilized in the connection between the running gear and the body, may be quickly and easily disconnected from the running gear, so that the running gear may be removed, leaving the runners attached to the body, so that the vehicle then becomes a sleigh.

By a novel connection between the body and the runners, the body is made reversible, so that it will face, either forward or rearward, and moreover, at will, may be quickly detached from the runner structure. The body is provided with supporting legs normally folded against the bottom of the body, but adapted when the body is detached from the runner structure to be turned down and used as legs to support the body, so that it may be used as a bed or crib. Preferably, also, detachable rockers are provided for application to the downturned legs of the body, so that the device may then be used as a cradle capable of being rocked.

A baby carriage or vehicle capable of the various different uses above described will be found highly efficient in almost any place where a baby carriage is required, but persons living in small apartments will especially appreciate the importance of such a convertible baby carriage or vehicle.

A commercial form of this convertible baby carriage or vehicle capable of all of its various adjustments and uses is illustrated in the accompanying drawings, and it may be further added that, as an important feature, the handle or push bar of the vehicle is detachably applied thereto, being preferably telescoped into sockets formed on the rear of the runner.

Referring to the drawings, wherein like characters indicate like parts throughout the several views:—

Fig. 2 is a perspective view showing by full lines the vehicle arranged for use as a sleigh, the normal position of the detached running gear being indicated by dotted lines;

Fig. 3 is a perspective view showing the body with its downturned legs adjusted so that the device is then capable of use as a bed or crib, the normal position of the runners which will then be detached, being, however, indicated by dotted lines;

Fig. 4 is a perspective view showing the rockers applied to the legs of the body, so that the device may then be used as a rocking cradle;

Fig. 5 is a perspective view of the detached running gear;

Fig. 6 is a perspective view of the detached runner structure, with the handle bar removed therefrom;

Fig. 7 is a perspective view of the detached handle bars;

Fig. 8 is bottom plan view of the bed frame of the body, showing the legs folded within the same;

Fig. 9 is a perspective view of the bed frame of the body showing the legs thereof turned down;

Fig. 11 is a fragmentary perspective with some parts sectioned on the line 11—11 of Fig. 10;

Fig. 12 is a detail in bottom plan view showing one of the connections between one of the runners and one of the axles of the running gear;

Fig. 13 is a section on the line 13—13 of Fig. 12; and

Figure 10:
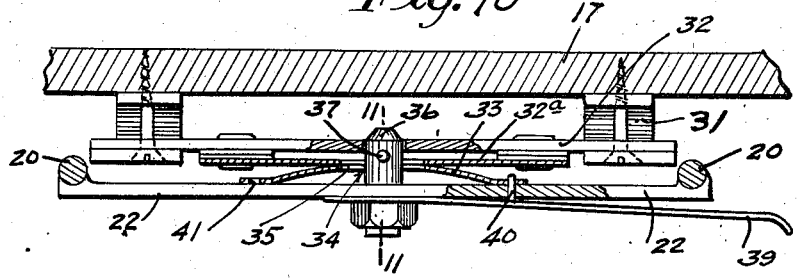
Fig. 10 is an enlarged transverse section on the line 10—10 of Fig. 8.

The body of the carriage, which is indicated by the numeral 15 may be of any suitable character or design and will, preferably be provided with the customary pivoted hood 16. Rigidly secured to the bottom of the body 15 is a suitable bed or frame shown as made up of a flat board 17 and metallic end flanges 18. So far as performing any of the adjustments above described, are concerned, this bed frame may be considered as a permanent part of the body 15, but it may, nevertheless, and preferably is rigidly but detachably secured to said body by screws 19, or the like, passed through side portions of the body and screwed into the board 17.

Figure 1:
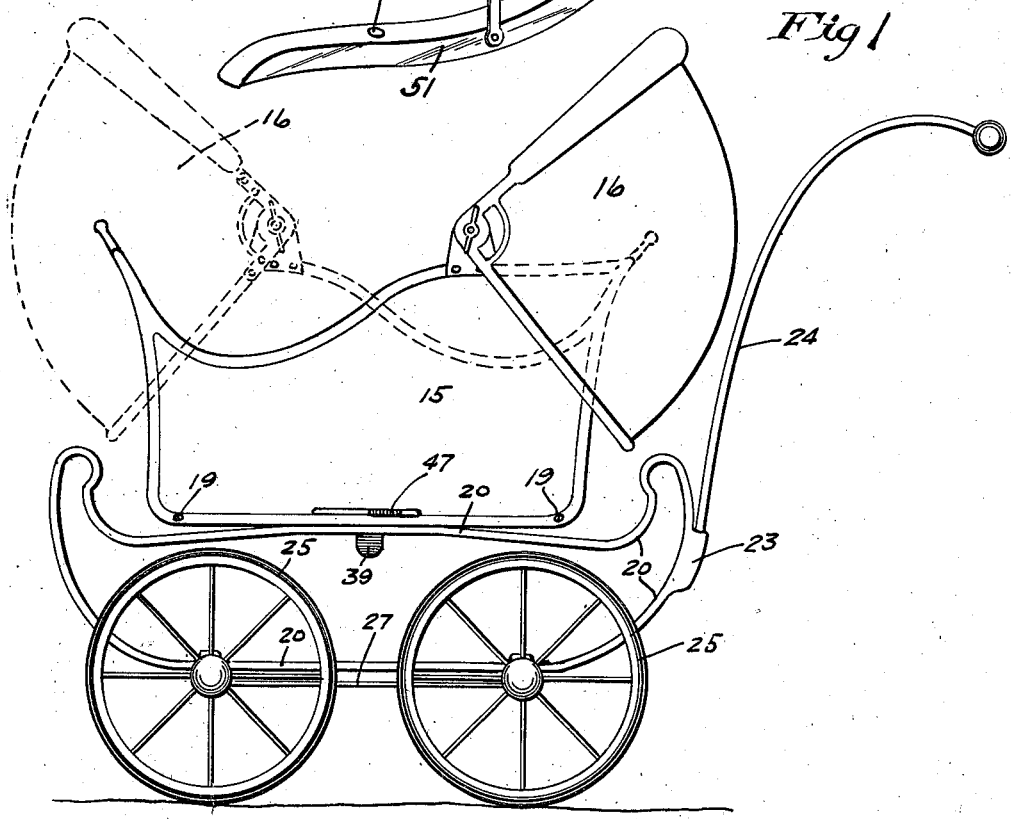
Fig. 1 is a side elevation, showing the vehicle in its use as a baby carriage running on wheels, one position of the body being indicated by full lines and the other by dotted lines.

The runner structure, as shown, and preferably designed, comprises two laterally spaced runners 20 and runner connecting cross bars 21 and 22, each runner 20 being made from a single piece of spring steel, such as a spring steel rod bent and secured in an endless formation with upturned rounded front and rear portions, substantially as shown in Figs. 1, 2 and 6. The runners 20, on their up turned rear portions, are formed with tubular sockets 23 into which the ends of the laterally spaced prongs of the handle bar 24 are adapted to be telescoped and held by friction, or otherwise.

The running gear, as shown, comprises wheels 25, axles 26 and transversely crossed axle-connecting reach bars 27.

By reference, particularly to Fig. 6, it will be noted that the cross bars 21 and 22 rigidly tie together the top portions of the runners 20, but leave the lower portions of the runners free for slight springing movements toward and from each other. As a simple and very efficient means for detachably connecting the lower portions of the runners 20 to the axles 26 of the running gear, I provide said axles, (see particularly Figs. 5, 12 and 13) each with two hook-like coupling brackets or lugs 28 shown as secured to the said axles by bolts 29 that are also used to couple the reach bars 27 of said axle. These coupling brackets 28 have approximately semi-circular seats that normally receive and hold the lower portions of the runners; and, as shown, said brackets 28 are provided with inwardly beveled upper portions 28ᵃ that assist in guiding the lower portions of the runners into the seats of the brackets. There will be sufficient tension in the runners to hold the same interlocked to the brackets 28, and hence, to the axles 26, against accidental uncoupling. To keep the runners from sliding forward or rearward, in respect to the running gear, the lower portion of the said runners are shown as provided with longitudinally spaced pairs of stop lugs 30 that engage the opposite edges of the brackets 28. The above construction, as is obvious, provides extremely simple and efficient means for quickly coupling the running gear to the runners or, conversely, for disconnecting the same therefrom.

By reference particularly, to Figs. 8, 9 and 10, it will be noted that yoke-like bars or brackets 31 are extended longitudinally of and rigidly secured to the frameboard 17, and that these brackets rigidly support a transverse central bar 32 that serves as a bolster. Rigidly secured to the central portion of this bar or bolster 32 is a disk-like center bearing plate 32ᵃ formed with an axial pin seat 34 having diametrically opposite laterally contracted notches or extensions 35.

The central cross bar 22 forms a sort of a bolster for the runner structure, and, at its center, is provided with an upwardly projecting stud or coupling pin 36 having diametrically projecting lock lugs 37 shown, as formed by a pin driven therethrough. The bearing plate 33, in the arrangement illustrated, instead of being directly secured to the bolster 32, is shown as rigidly secured at its central portion by welding, or otherwise, directly to the central portion of a slightly yielding supplemental bar 32ᵃ that is spaced below bolster 32 and attached thereto at its ends. The axial hole 34 and notches 35 are extended also through the supplemental bar 32ᵃ, and bolster 32 is provided with a pin passage in line with said axial passage 34 and into which the upper end of coupling stud 36 is adapted to be inserted.

When the carriage body 15 is turned at 90 degrees to the longitudinal axis of the running gear and runner structure, the lugs 37 of stud 36 may be passed through the notches 35 of axial passage 34, so that the vehicle body may be then either applied or removed. When the coupling stud 36 is inserted, as just described, and its lugs 37 are forced above the bearing plate 33 and supplemental bar 32ᵃ and the carriage bottom is then turned in either direction, either for forward or rearward facing thereof, the lugs 37 will be moved over the top of supplemental bar 32ᵃ, thereby, with a sort of bayonet joint action coupling the body to the bolster 22 of the runner structure. To take up slack and prevent rattling, supplemental bar 32ᵇ (see Fig. 11) may be provided with raised surfaces 38 onto which the lugs 37 are forced when the body 15 is turned parallel to the runners.

To positively lock the body, facing either forward or rearward, I provide a latch lever 39, which, as shown, is a spring bar underlying the bolster 22 and attached to the lower end of the stud 36. This latch lever 39 has an upstanding lock pin 40 that works freely through a perforation in the bolster 22 and is engageable with one or the other of diametrically opposite holes 41 (see Figs. 8 and 10) in the rim portion of the center bearing plate 33. Of course, by depressing the free end of lever 39, the body is freed so that it may be rotated to the above noted position for removal.

For supporting the carriage body for use as a bed, crib or cradle, I provide the bed plate 17 with four legs 42 connected in pairs by cross bars 43. At their upper ends, the legs 42 are connected to hinge brackets 44 secured to the corners of the bed plate 17, adjacent to the end flanges 18 thereof. For holding the pairs of legs locked in their downturned position, I provide, for each pair of legs, a toggle 45 connected between diametrically opposite legs and brackets 46 on the bottom of the board 17. These toggles, in Fig. 9, are shown as slightly buckled upward, so that the legs can be folded against the board 17, but when the said toggles are forced slightly downward beyond their dead centers, they will lock the legs, in pairs, so that they will not accidentally fold, and in fact cannot be folded until the toggles are first buckled upward.

Preferably, I provide a lever 47 with connections for simultaneously moving both pairs of legs to folded positions, or to downturned positions. This lever, (see Fig. 9) is located close to the bottom of the board 17, works above the horizontal portions of the brackets 31, is intermediately pivoted to a bearing 47ª on the bottom of the board 17 and is connected by rods 48 to brackets 49 secured on diametrically opposite legs 42 at points slightly below their hinged upper ends. The outwardly projected end of the lever 47 is free to be sprung slightly upward and downward, and when in a position to turn the legs 42 down, is adapted to be locked in such position by engagement with a lug 50 secured on the bottom of the board 17 as shown in Fig. 9. Thus, it will be seen that the legs, when turned down, may be double-locked, and this arrangement is preferred, although a single lock might answer the purpose.

Figure 14:
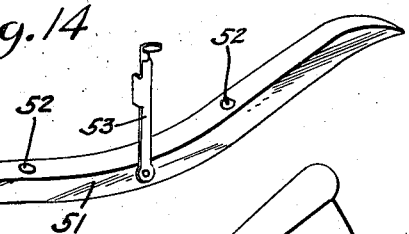
Fig. 14 is a perspective view showing one of the rockers and its attaching hook.

The rockers 51 shown in Figs. 4 and 14 are provided with holes 52 into which the reduced lower ends 42ª of the legs 42, are adapted to be inserted when the rockers are to be applied. To securely hold the lockers interlocked to the ends of the legs, said rockers are shown as provided with long pivotally attached hooks 53, the free ends of which are adapted to engage headed studs 54 on the cross bars 43 of the legs 42 (see particularly Figs. 4, 9 and 14). To adapt the carriage body 15 to be readily carried or lifted, it is shown as provided with carrying handles 55 applied, one to the foot and the other to the head thereof.

The manner in which the various devices are manipulated to connect, or disconnect the various elements of the device described has already been made clear, and it is evident that all of these operations may be very quickly and easily performed. When the vehicle is adjusted or arranged, as shown in Fig. 1 by full lines, and in Fig. 2 by both full and dotted lines, an ordinary baby carriage, or carriage capable of being used as such is provided, but this carriage has the advantage over other carriages that it may be quickly converted for other uses. Simply by springing inward the lower portion of the runners 20, the entire running gear may be quickly detached, leaving the vehicle in condition for use as a sled. There will be sufficient spring in the runners to make the vehicle easy riding, both when used as a carriage and when used as a sleigh, and hence, the runners perform a very useful function, even when the running gear is applied.

Of course, the body 15 may be removed from the runner structure at any time and without regard to whether or not the running gear is applied to the runner structure. When the body is removed, the four legs may be simultaneously thrown downward by manipulation of the lever 47, and they may be locked in such downturned positions by either one or both of the locking means described. When the downturned legs are set upon the floor, the body will be further supported for use as a bed or crib, but, as already pointed out, if a rocking cradle is desired, the rockers may be quickly applied to the downturned legs. Whether used as a sleigh or carriage, the body may be quickly turned, either for forward or rearward facing. The handle bars, of course, may be quickly detached, and they will be detached for the purpose of shipment, or when the body is to be used as a crib or cradle, they will, of necessity be detached from the body, since they are directly applied to the runners.

Attention may be further called to the fact that when the running gear is attached, the runners or runner structure affords a framework carried by the running gear and directly supporting the vehicle body.

What I claim is:

1. A baby carriage having in combination, a body, a running gear comprising wheels and axles, a pair of springs each formed of a substantially continuous piece of material bent to form a closed figure with convex end portions, the bottom of said figure being straight and each of said springs having pairs of spaced means on their upper sides adapted to co-operate with detachable connecting devices on said axles whereby said running gear may be readily removed without removing said body.

2. A baby carriage comprising a running gear including wheels, axles and connecting means therefor, laterally spaced runners cross connected at their upper portions and being resiliently movable toward and from each other at their lower portions, means on said axles to which the lower portions of said runners are detachably connected and in which they are held by their resilient action away from each other, a body attached to the upper portion of said runners, and handles connected to said runner structure.

3. A baby carriage having in combination, a body portion, a spring portion adapted to form a pair of runners, means for detachably connecting said body portion to said spring portion, a running gear, means for detachably connecting said spring portion to said running gear, a plurality of legs pivoted to said body portion beneath the same and adapted to fold into flat relationship therewith, and means for simultaneously moving said legs to extended position.

4. A baby carriage comprising a body, a spring runner structure detachably connected to said body, a wheel-equipped running gear detachably connected to said runner structure, said body having hinged legs that are folded against the bottom thereof when the body is connected to said runners but are adapted to be turned down to support said body when the latter is disconnected from the runners, a lever with connections for simultaneously moving said legs from folded to downturned positions, and vice versa, and means for locking said legs in downturned positions and a handle bar connected to said runner structure.

5. The structure set forth in claim 3, said legs being formed at their lower ends for attachment to a pair of rockers.

6. A baby carriage comprising a wheel-equipped running gear, laterally spaced runners cross connected at their upper portions, and resiliently separable at their lower portions, means for detachably connecting the lower portions of said runners to the axles of said running gear, comprising coupling brackets on said axles having notches to receive the lower portions of the runners, and locks on the lower portions of said runners engageable with said brackets to hold the runners against forward and rearward movements.

7. In a baby carriage, the combination with a body, of laterally spaced spring rods bent to form endless runners, the upper portions thereof being adjustably connected to said body and the lower portions thereof being capable of springing movement toward and from each other, of a wheel-equipped running gear, and co-operating interlocking devices on said running gear and on the lower portions of said runners for detachably connecting the same.

8. A baby carriage having in combination a body, a running gear comprising wheels and axles, a pair of springs between said body and said running gear comprising closed structures, each having top and bottom members, the top members being rigidly connected and the bottom members being resiliently movable toward and from each other, and detachable connecting means on said axles with which said lower members are adapted to engage and be held in such engagement by said resilient movement.

9. In a baby carriage, the combination with a running gear and a framework supported thereon, of a body, and means for detachably and pivotally connecting said body to said framework, comprising a center bearing plate connected to one of said members and a stud connected to the other of said members, said stud having laterally projecting lugs, and said center bearing plate having a stud receiving perforation with notches through which the lugs of said stud may be passed when said body is turned crosswise of the framework.

10. A baby carriage having in combination a body, a spring comprising an elongated closed figure with substantially parallel upper and lower portions at each side of the body and extending longitudinally thereof, the upper portions of said closed figures being disposed adjacent said body and the lower portions being provided on their upper sides with spaced means for detachable connection to the axles of a wheel-equipped running gear, and being resiliently movable toward each other, the bottom sides of said springs being smooth and uninterrupted to form a pair of sled runners.

11. In a baby carriage, a connection between the body and spring structure thereof, comprising a bolster connected to the latter, a coupling stud projecting upwardly therefrom, a locking pin extending transversely through said stud, a bearing plate fastened to the carriage body having an aperture therein adapted to receive said stud and pin, and a supplemental member carried by said bearing plate and having lugs thereon, upon which the locking pin is adapted to ride.

12. In a baby carriage having a body and running gear comprising wheels and axles, a spring structure adapted to be disposed between the body and running gear comprising two closed spring structures, each having upper and lower longitudinal extending members, means rigidly connecting said upper members and said lower members, being resiliently movable toward and from each other and adapted to be detachably connected with said axles.

13. A baby carriage having in combination, a body member, a spring structure comprising a pair of resilient rods bent into closed figures adapted to form runners, means for detachably connecting said body member to said spring structure, a running gear and means for detachably connecting said spring structure to said running gear.

14. A baby carriage having in combination, a body member comprising a plate, a bearing connected thereto and spaced therefrom having an aperture therein, a member having a slot therein spaced from said bearing and connected thereto, a spring structure having a stud projecting upwardly centrally therefrom with a cross member in said stud, said cross member being adapted to be passed through the said slot and turned at right angles thereto between the said bearing and the member having a slot therein, said stud projecting into the aperture in said bearing.

15. The structure set forth in claim 14, resilient means below said bearing and raised means on said first mentioned member upon which said cross member rides to place said resilient means under tension and to prevent rattling of said parts.

16. A baby carriage having in combination, a body member, a spring structure, a detachable connection for said body and spring structure adapted to be disconnected by turning the longitudinal axes of said body and spring structure at right angles and means for preventing loose movement and rattling of said detachable connection.

17. A baby carriage having in combination, a body member, a running gear and a spring structure detachably connected thereto, means for detachably connecting said body member to said spring structure, a plurality of legs pivoted to the bottom of said body member and means for simultaneously extending said legs or folding the same in collapsed condition against said body member.

18. A spring structure for a baby carriage comprising laterally spaced closed spring structures each formed of one piece of material having straight parallel upper and lower portions and a plurality of transverse connecting members extending across the upper portion.

In testimony whereof I affix my signature.

CHARLES O. ROBINSON.